No. 835,521. PATENTED NOV. 13, 1906.
H. F. HARFST.
ANIMAL TRAP.
APPLICATION FILED AUG. 7, 1906.
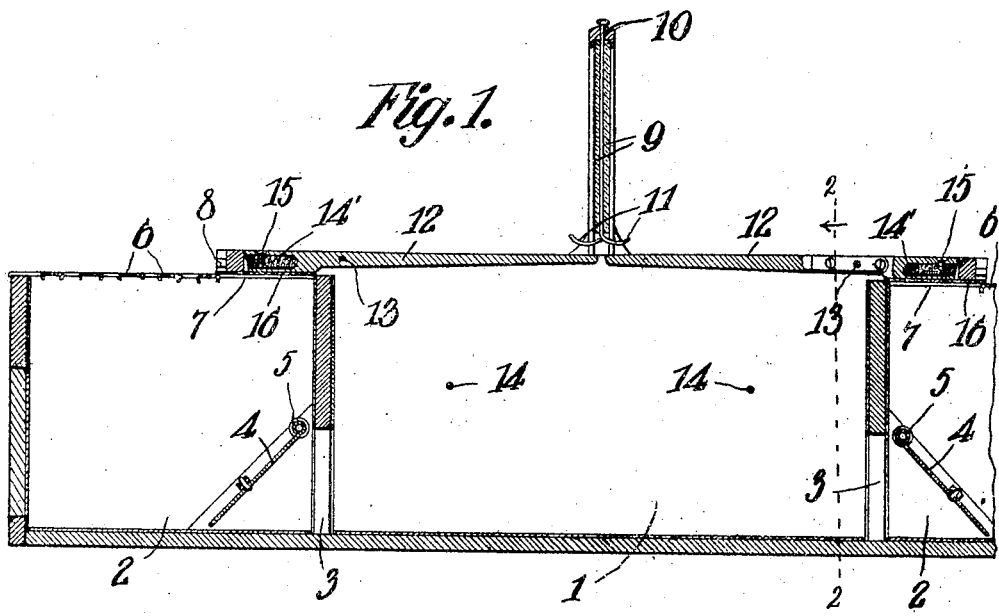
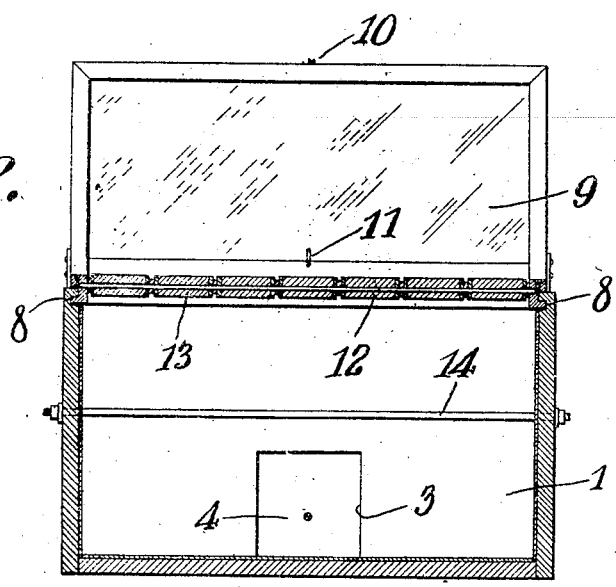
WITNESSES: Henry F. Harfst, INVENTOR.
E. K. Stewart, By C. A. Snow & Co.
ATTORNEYS

UNITED STATES PATENT OFFICE.

HENRY F. HARFST, OF META, MISSOURI.

ANIMAL-TRAP.

No. 835,521.  Specification of Letters Patent.  Patented Nov. 13, 1906.

Application filed August 7, 1906. Serial No. 329,574.

*To all whom it may concern:*

Be it known that I, HENRY F. HARFST, a citizen of the United States, residing at Meta, in the county of Osage and State of Missouri, have invented a new and useful Animal-Trap, of which the following is a specification.

This invention has relation to animal-traps especially adapted to catch rats and mice; and it consists in the novel construction and arrangement of its parts, as hereinafter shown and described.

The object of the invention is to provide a trap so constructed and arranged as to effectually and surely entrap the rodent and after it is sprung or operated to automatically set and adjust itself for future operation.

The trap consists, primarily, of a body portion communicating at its sides or ends with reception or accumulating compartments and an inclined gravity-actuating door leading from the body portion of the trap into such compartments. The upper portion of the trap is slidably detachable from the body portion thereof and is provided with an enticing or luring means, which consists of a mirror, at or near which is provided a hook to which the bait is attached. A series of trips or skids are pivoted to the slidable portion of the trap and are weighted at their outer ends in order to normally retain themselves in level positions. The opposite or lighter ends of the said trips or skids are disposed toward the enticing or luring means and the said bait.

In the accompanying drawings, Figure 1 is a longitudinal sectional view of the trap. Fig. 2 is a transverse section of the same, taken on the line 2 2 of Fig. 1.

The trap comprises the body portion 1, having arranged at its ends the accumulating-compartments 2 2. Openings 3 are provided in the ends of the body portion 1 and are normally closed by the gravity-actuated inclined doors 4, which are hinged at their upper ends 5, the said upper ends being spaced a slight distance from the side walls of the compartment 1. The gratings 6 are located on top of the compartments 2 2. The said gratings do not extend all of the way from the outer sides of the said compartments to the sides of the body portion 1; but the intervening spaces 7 are left in order that the animals may be readily removed from the said accumulating-compartments 2. The upper edges of the body portion 1 are provided with the guides 8. The frame of the upper portion of the trap is made to slidably engage the said guides 8. The said upper portion of the trap is provided at a point preferably midway of its ends with the vertically-disposed mirrors 9 9. The wire 10 extends down from the top of the framework supporting the said mirrors and projects at its lower ends in front of the lower edges of each mirror 9 in form of the hooks 11 11, which are adapted to retain the bait. (Not shown.)

Each side of the top of the trap is provided with a series of pivoted trips or skids 12. The said trips are all pivoted on the horizontal rod 13, which is secured at its ends in the framework of the said top. The horizontal rod 14 is attached at its ends to the side of the body portion 1 of the trap and is adapted to limit the downward swing of the said trips or skids 12. Each said trip 12 is provided at or near its end with a recess 14', which is adapted to hold shot, and a passage leading into the said recess from the top of the trip, being normally closed by an ordinary wood-screw 15. Thus the said ends of the said trips are weighted, and the said trips 12 are normally held in horizontal positions, the ledge 16 being secured to the framework of the top of the trap and limiting the downward movement of the weighted ends of the said trips. The opposite ends of the said trips are disposed toward and terminating in the vicinity of the mirrors and bait-retaining hooks. The ledges 16 normally close the openings 7, and when the said top is shifted to one side the said ledges pass beyond the said openings, and the animals may be removed. When the trap is constructed of wood, all the interior surfaces are preferably covered with tin or other sheet metal, as is the usual practice in the construction of traps of the character stated.

In operation bait is placed upon the hooks 11, and the rodent attracted thereto by natural instincts will attempt to get on top of the trap. As soon as this attempt is made his attention is attracted to the bait, and seeing himself in the mirror located directly behind the bait he imagines that another animal of his same counterpart is attempting to get the bait, and he all the more eagerly approaches the bait, and in doing so he passes beyond the pivots of the trips or skids 13 and their light ends under his weight descend and he is precipitated into the body 1 of the trap. By reason of the weights applied to the said trips the skids 13 immediately assume normal positions. The rodent being in the body of the trap and the doors 4 4 being spaced slightly at their upper ends away from the ends of the body portion 1, the rodent will make for the rays of light coming through such spaces, and in doing so he pushes by and lifts the said doors 4 and enters the compartment 2, and thereby establishes his close confinement. He is also out of the way and does not interfere with the similar conduct of other animals to follow.

Having described my invention, what I claim as new, and desire to secure by Letters Patent, is—

A trap comprising a body portion, pen-compartments arranged at opposite ends thereof and having openings adjacent each end of the body portion, an open frame slidably engaging the body portion and extending beyond the openings of the pen-compartments and arranged to slide over either pen-compartment, two series of trips, oppositely disposed and pivoted to said frame and normally closing the opening thereof, mirrors mounted upon the frame bait-hooks attached to said mirrors and ledges carried by the frame and which serve as trip-stops and closures for the openings of the pen-compartments.

In testimony that I claim the foregoing as my own I have hereto affixed my signature in the presence of two witnesses.

HENRY F. HARFST.

Witnesses:
 PAUL SCHULZ,
 GERHARD HARFST.